US006891805B2

(12) United States Patent
Hines

(10) Patent No.: US 6,891,805 B2
(45) Date of Patent: May 10, 2005

(54) COMMUNICATIONS SYSTEM

(75) Inventor: Richard Hines, Stony Brook, NY (US)

(73) Assignee: Telephonics Corporation, Farmingdale, NY (US)

( * ) Notice: Subject to any disclaimer, the term of this patent is extended or adjusted under 35 U.S.C. 154(b) by 771 days.

(21) Appl. No.: 09/777,937

(22) Filed: Feb. 6, 2001

(65) Prior Publication Data

US 2002/0105978 A1 Aug. 8, 2002

(51) Int. Cl.[7] .............................................. H04L 12/28
(52) U.S. Cl. .................. 370/254; 370/503; 709/220
(58) Field of Search ................................. 370/254, 503, 370/257, 465, 466, 467, 282, 461, 509, 510, 512; 709/220, 222, 221, 209; 340/825.4; 246/167 R, 187 C; 375/356; 713/1

(56) References Cited

U.S. PATENT DOCUMENTS

| | | |
|---|---|---|
| 3,940,558 A | 2/1976 | Gabbard et al. |
| 4,814,984 A | 3/1989 | Thompson |
| 4,935,925 A | 6/1990 | Williams et al. |
| 4,939,752 A | 7/1990 | Literati et al. |
| 5,023,778 A | 6/1991 | Simon, Jr. et al. |
| 5,068,877 A | 11/1991 | Near et al. |
| 5,265,832 A | 11/1993 | Wesling et al. |
| 5,289,176 A | 2/1994 | Novakovich et al. |
| 5,305,316 A | 4/1994 | Yoshida et al. |
| 5,329,525 A | 7/1994 | Sakagami |
| 5,469,545 A | 11/1995 | Yanbuskirk et al. |
| 5,630,173 A | 5/1997 | Oprescu |
| 5,704,032 A | 12/1997 | Badovinatz et al. |
| 5,751,220 A | 5/1998 | Ghaffari |
| 5,778,188 A | 7/1998 | Taniguchi et al. |
| 5,790,791 A | 8/1998 | Chong et al. |
| 5,793,968 A | 8/1998 | Gregerson et al. |
| 5,951,683 A | 9/1999 | Yuuki et al. |
| 6,112,230 A * | 8/2000 | Monch et al. ............... 709/208 |
| 6,141,330 A | 10/2000 | Aikers |
| 6,148,002 A | 11/2000 | Patel et al. |
| 6,680,918 B1 * | 1/2004 | Haley ......................... 370/282 |
| 6,700,892 B1 * | 3/2004 | Rabinovich ................. 370/403 |
| 6,731,649 B1 * | 5/2004 | Silverman ................... 370/466 |

* cited by examiner

Primary Examiner—Ajit Patel
Assistant Examiner—Steven Blount
(74) Attorney, Agent, or Firm—Schweitzer Cornman Gross & Bondell LLP

(57) ABSTRACT

A multi-point communications system joins a series of communications units in a series chain while providing communications between and among all of the units. Each communication unit comprises a pair of frames, preferably operating under E1/T1 protocols connected in a back-to-back arrangement through the framers' local serial busses. Communication data is placed on and extracted from a designated set of channels on the serial busses while preamble data, controlling the passage and routing of the communications data, is placed on a separate set of bus channels. One of the interconnected communications units is designated as the "parent", and provides supervisory control over communications data, timing and flow. Designation of the parent unit may be performed on a dynamic basis to allow the communications system to dynamically adapt to changes in system size as communications units are added or dropped.

9 Claims, 8 Drawing Sheets

Fig 7A

Mode Table

| LOS1 | LOS2 | Rx | Address | Master | Slave | Free-run |
|---|---|---|---|---|---|---|
| 0 | 0 | 0 | 0 | end 2 | end 1 | |
| 0 | 0 | 1 | 1 | end 1 | end 2 | |
| 0 | 1 | 0 | 2 | end 1 | end 2 | |
| 0 | 1 | 1 | 3 | end 1 | | end 2 |
| 1 | 0 | 0 | 4 | end 2 | end 1 | |
| 1 | 0 | 1 | 5 | end 2 | | end 1 |
| 1 | 1 | 0 | 6 | | | |
| 1 | 1 | 1 | 7 | | | |

COMMUNICATIONS SYSTEM

The present invention relates to a multi-station communication system, and in particular to a communications system which can reconfigure itself to size changes and which provides a communications protocol which allows the use of point-to point communication to enable a multi-station system.

BACKGROUND OF THE INVENTION

The use of communications systems for the transfer of voice and data between and among locations has become widespread. The use of industry-wide standards and protocols has accelerated such use, as they allow the designers of communication systems in accordance with such standards to take comfort in knowing in advance that a particular level of performance can be realized. In addition, the use of components and systems utilizing such standards allows the specification of components and sub-systems to be simplified, since compliance with a particular standard eliminates the need for tailoring the system to accommodate a particular element's thereof characteristics, and can permit or facilitate the interchange of components from various sources without compatibility concerns.

Typical communication systems utilize timing and synchronization signals to control event timing and to allow the passage of data between the units in a coordinated manner. One of the interconnected units is typically designated as a master, with the remaining units designated as slaves. The master unit generates the timing signals which are coordinated, or slaved, to by the remaining units. In this manner a unitary, system-wide time base and synchronization protocol is established and maintained.

It is of course important that coordination and synchronization is maintained as the system grows or shrinks. In many applications the reconfiguration of a system is done by a skilled technician, having the ability to reconfigure the system as appropriate. Further, other systems allow the addition and deletion of slave units with automatic reconfiguration, improving the versatility of such systems and simplifying the reconfiguration process.

Time Division Multiplexing (TDM) is a particularly popular and well accepted transmission method for telephony systems. Some TDM standard protocols are known as ISDN/E1/T1. They provide a robust architecture but are most commonly used in rack-mounted systems or the like for point-to-point communications in which interconnections between, and communications among, more than two users or locations is not typically contemplated. In an E1/T1 type system, one of the interconnected units must be configured to provide the necessary timing and sync signals for the unit or units which follow. In addition, E1/T1 type systems cannot typically be used to enable selective communications between a plurality of communications units as may be required in a rail car communications system and the like.

Rail cars have adopted the use of communication systems utilizing microprocessors to control operational functions and passenger communications. Towards such ends, the communications units in each car must be interconnected. Such rail car communications systems, however, present system interconnection requirements which differ from many other systems, and particular do not typically permit E1/T1 protocol systems to be employed. In addition to a rail car system requiring a varying number of communications units as a train is assembled from individual cars, a particular car may be attached to an existing train or sequence of cars at either end thereof. In a similar manner, individual cars can be removed from a train and/or their location within a train shuffled. This dynamic reconfiguration places additional burdens on the communication system between the cars. The coupling and uncoupling of rail cars is typically accomplished by personnel not having the necessary technical training required to reconfigure the communication system to accommodate the new car, nor during normal train operations do they typically have the time or are they often even permitted access to the communications system. Even communications systems which have the capacity to automatically accept the addition or deletion of additional "slave" units are ill-equipped to accommodate the loss of a designated master unit.

It is accordingly a purpose of the present invention to provide a multiple unit communications system or network incorporating E1/T1 type architecture.

Another purpose of the present invention is to provide a communications system, such as a communications system utilizing the E1/T1 protocol, which allows a plurality of individual communications units to be interconnected and operated in a flexible manner, and without the need for manual reconfiguration.

Yet another purpose of the present invention is to provide a method and apparatus for the automatic mediation and assignment of a responsibility, such as timing and/or synchronization of communications units, between peer units in a multiple unit system, and particularly a communication system.

A further purpose of the present invention is to provide a method and apparatus for dynamically allocating master and non-master relationships among E1/T1 protocol communications units as they are joined to and separated from each other within a communications system.

Still another purpose of the present invention is to provide a multi-drop communications system utilizing E1/T1 type architecture in which communications between units may be controlled by a parent unit, wherein communications are passed from or to the parent and a plurality of child units.

BRIEF DESCRIPTION OF THE INVENTION

In accordance with the foregoing and other objects and purposes, a first aspect of the present invention provides a method and apparatus in which communications units comprising a pair of E1/T1 type protocol communication devices or framers can be interconnected to form a multiple unit series communications system or network capable of supporting communications among or between any of the communications units in the system. While each of the E1/T1 framers operates in a point-to-point manner, the overall system architecture and configuration allows communications to be established and maintained between and among individual communications units, each one of which may be associated with a different rail car.

A second aspect of the invention provides a method and apparatus for dynamically configuring an electrical system, such as a communications system, having a plurality of interconnected units, to allow assignation of one of the units to perform a task from a plurality of the interconnected units capable of performing the task, and then to configure the system in response to the assignation and maintain the system in an operational mode, dynamically reconfiguring the system, including re-assignment of the task as required, and particularly as units are added or dropped from the system.

In further accordance with the first aspect of the invention, each communications unit of the communications system comprises a pair of E1/T1 protocol framer units, coupled together in a "back-to-back" orientation whereby the two framers form first and second communication "ends" which are enabled to permit point-to-point communications between the communications unit and adjacent communications units to which the communications unit is directly connected. Means are provided in each communications unit, in association with the coupling of the framers to each other within the communications unit, for controlling and dispatching data which is locally generated for transmission by the framers of the communications unit and for redirecting from one framer to the other data received by either of the framers of the communications unit.

Communication is established between communications units on a point-to-point basis, but with each communication being passed along the entire length of the system. To mediate the passage of communications and other data along the path of interconnected communications units, one of the communications units is designated as a "parent" unit, the remaining units of the interconnected system designated as "children." Preferably, communications are directed by the parent communications unit to occur between the designated parent unit and a particular one or more child units. A child is capable of effecting a transmission only in response to permission granted by the parent. Each transmission, however, may be passed along the entire length of the communications system to allow all units to receive transmitted data for processing and action.

In order to allow interconnected units of an electrical component system, such as a communications system, to configure itself and dynamically reconfigure itself as units are added or dropped, and in accordance with the second aspect of the invention, the electrical component units capable of or initially designated as having the potential for performing a particular task, such as the generation of timing and clock signals for a communications system, are identified and each is assigned an individual identifier. The identifiers are then passed to the other identified units and compared. If any two of the identified units have the same identifier, all the identified units are reassigned new identifiers. The comparison is repeated, and new identifiers assigned, until each identified unit has a unique identifier. One of the unique identifiers is then chosen, preferably on a random basis, to designate the unit to perform the task and the unit is so enabled. The remaining units of the system are then configured to interface with the enabled unit. The procedure can be performed on an ongoing basis to accommodate dynamic changes to the system.

The invention may be embodied in a communications system comprising a plurality of communications units coupled together in a series relationship with two opposed end or terminal units and a varying number of intermediate units therebetween. In such a configuration the invention provides for the continued dynamic assignment of one of the terminal units as both a parent unit and as the source for timing signals for the communications system, and for the continued dynamic configuration of the remaining coupled communications units in association therewith as child units, whereby changes to the length of the communications system are immediately compensated for. The invention is thus of particular applicability to communications systems operating under E1/T1 and similar protocols which require the designation of a particular communications unit to be the source of timing signals for the system.

Each communications unit is individually characterized either a terminal unit or an intermediate unit. This may be accomplished by consideration of signals normally generated by the communications unit based upon its connection status with other units. Each terminal unit is then assigned an identifier, which is passed along the communications system to the other terminal unit. The received identifier is compared to the recipient terminal unit's identifier. The identifiers are varied until the comparison process verifies that the two terminal units have different, and thus unique, identifiers. Once this is accomplished one of the identifiers is designated, and the terminal unit having that identifier is configured appropriately to generate the necessary system signals. The remaining communications units are then configured in accordance with their status as either an intermediate unit or as the remaining terminal unit.

In connection with communications systems operating under an E1/T1 protocol, unit status can be determined by consideration of a sync/loss-of-sync status signals normally generated by the individual framer units. The identification code may by a one-bit long data element (on/off), generated, assigned and reassigned randomly. The combination of the sync/loss-of-sync and identifier signals associated with each communications unit can be multiplexed together to form a data word which is processed to generate the required configuration instructions for the individual communications units.

In a preferred embodiment, where the terminal communications unit generating the system-wide timing and sync signals is designated as the "parent" unit for the system and all remaining units being designated as equal "children", communications can be effected between units by the parent polling each of the children for permission to send data. The parent allows child units, on a one-by-one basis, to transmit data to the parent which is also passed throughout the system and received by all children to be acted upon or processed as appropriate.

BRIEF DESCRIPTION OF THE DRAWINGS

A fuller understanding of the invention will be accomplished upon consideration of the following explanation of a preferred, but nonetheless illustration embodiment thereof taken in association with the annexed drawings, wherein:

FIG. 3A is a logic chart for the configuration signals generated by the invention;

FIG. 7A is a chart of the inputs to the logic processor.

DETAILED DESCRIPTION OF THE INVENTION

Figure 1:
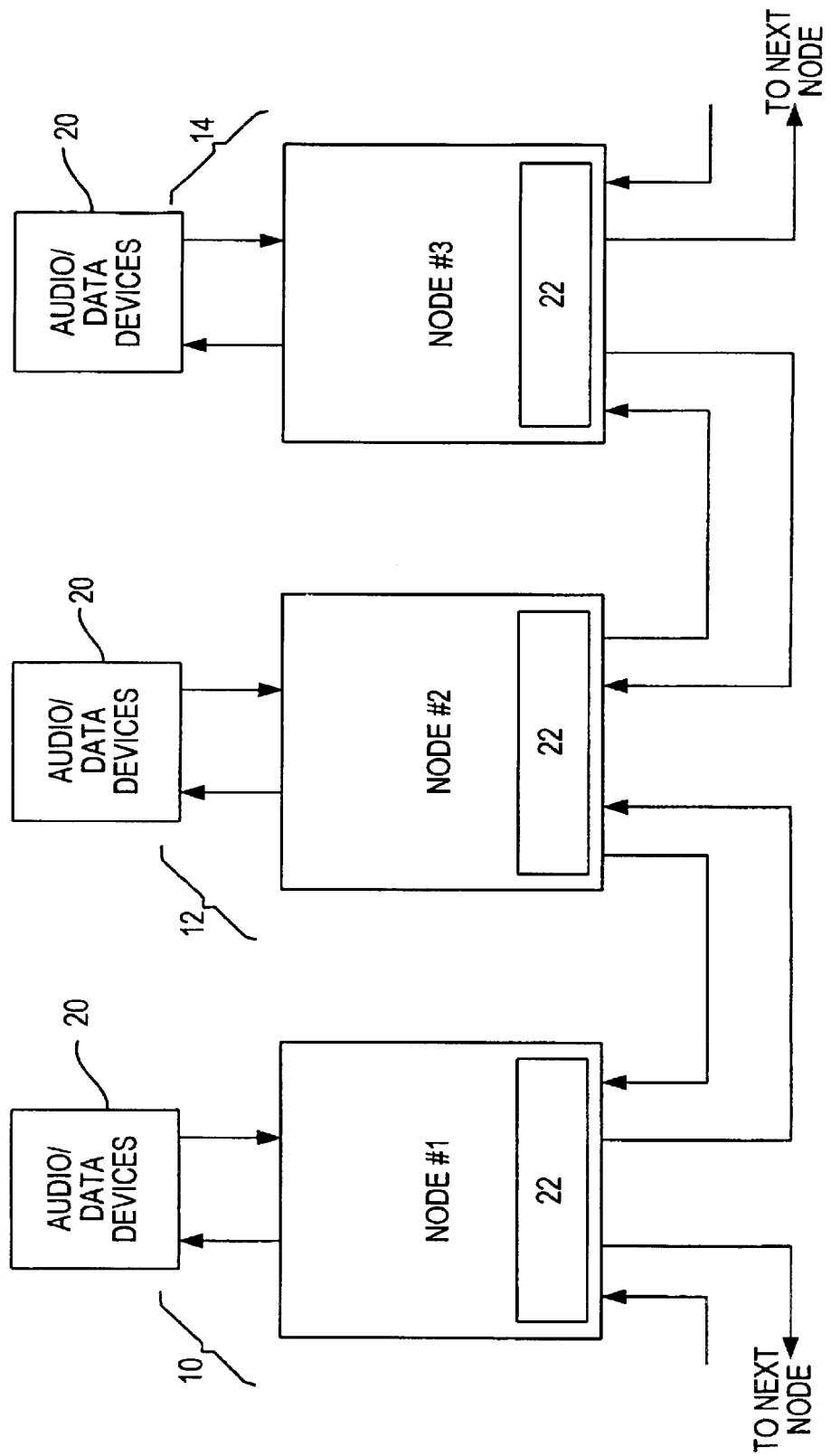
FIG. 1 is a block diagram of a portion of a communications system in accordance with the invention.

With initial reference to FIG. 1, the present invention is directed to enabling the configuration of a plurality of interconnected electrical units, such as communications units 10–14, each of which defines a communications node. Each of the communications units 10–14 may be located, for example, in a different rail car, the rail cars being coupled together to form a train whereby the communications units are correspondingly coupled together through multiple channel busses 18 running between the rail cars. Each of the communications units may operate under an E1/T1 protocol, and thus is in point-to-point communications with its immediately adjacent node(s). One or more audio and/or data devices 20 may be associated with each communications unit, and generates and/or broadcasts or displays the audio and other data which are transmitted by the communications system between and among nodes as required. Control circuitry 22 in each communications unit allows the data to delivered along the entire communications system, despite the point-to-point configuration of the individual framers employed in each communications unit. Utilizing the architecture of the present invention, an unlimited umber of nodes made be coupled together in a series chain with communications enabled along the entire chain as individual communications units or nodes are added or dropped.

Figure 2:
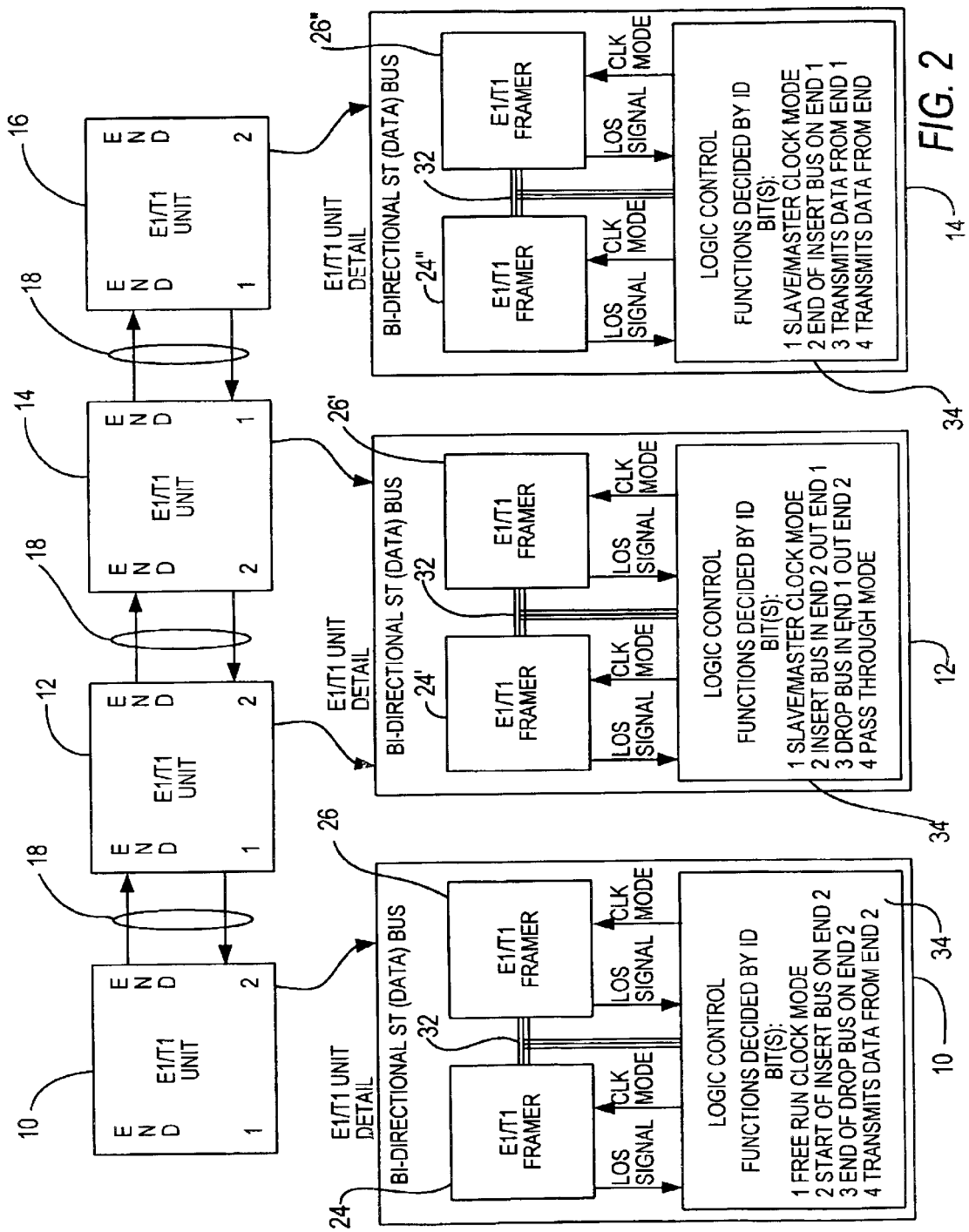
FIG. 2 is a block diagram of individual communications units coupled together into a four-unit communications system, depicting the framers therein and illustrating the interconnection of the framers and an adaptive mode logic control circuit therein for dynamically configuring the framers of the communications system in accordance with the invention.

Referring next to FIG. 2, each of the nodes or communications units 10–16 includes a pair of E1/T1 framers, such as 24, 26 in end or terminal unit 10; framers 24', 26' in intermediate communications unit 12 or 14, or framers 24", 26" in second end unit 16. Each framer is a unit as known in the art, providing interconnects for a bus channel 18 to connect with another remote framer for long distance communications. Each of the channels can comprise a large number, typically upwards of 30, individual data busses. Each individual bus may carry a different form of data, and is typically assigned individually in accordance with the needs of the communications system.

Figure 4:
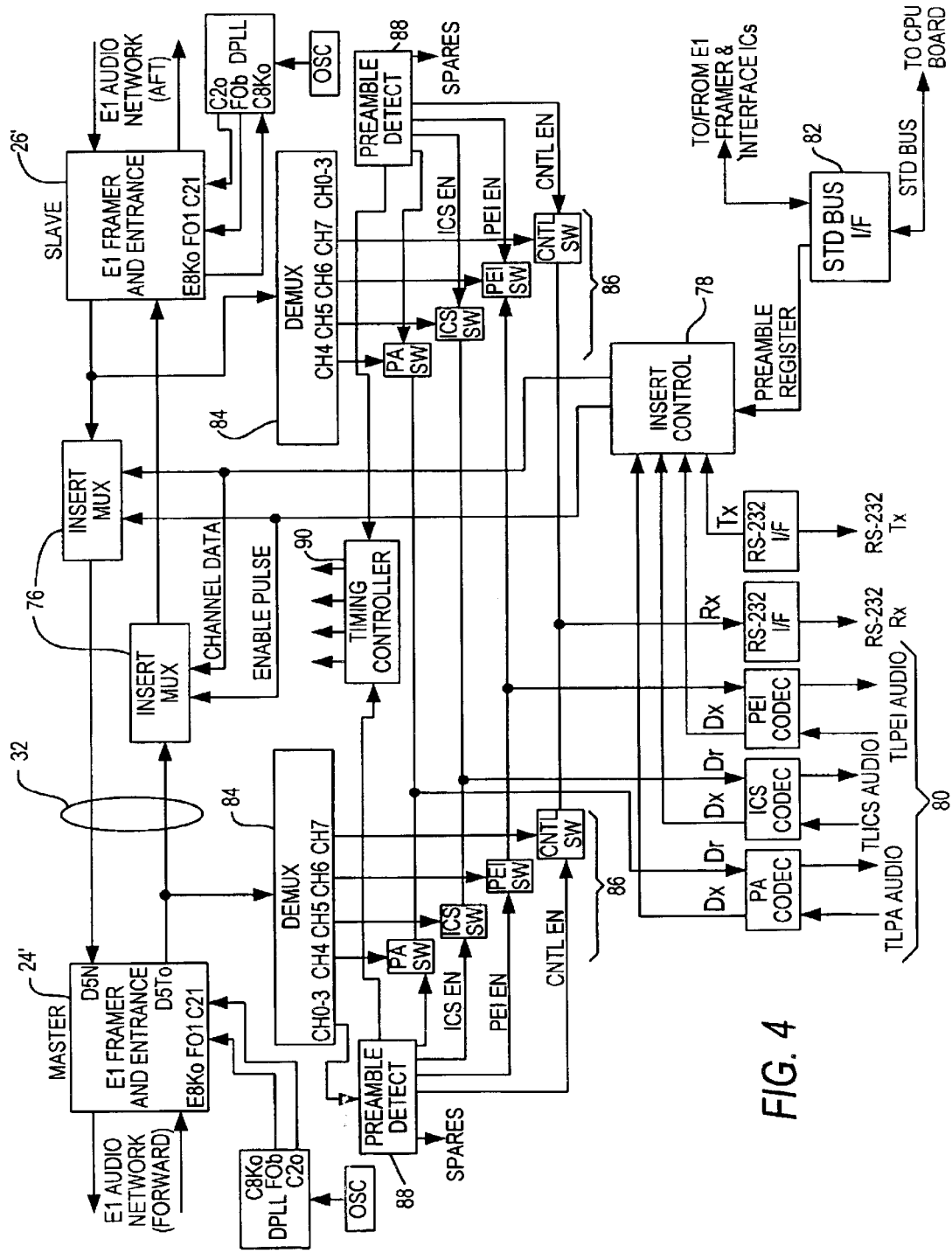
FIG. 4 is a detailed block diagram detailing the data communications configuration of an individual communications unit.

Each framer of a communications unit is interconnected with the other framer of the communications unit by a short distance bi-directional serial bus 32. An adaptive mode circuit ("AMC") 34 is coupled to the two framers and serial bus, and provides the necessary configuration data to the framers to allow them to operate as part of an integrated, multi-station communications system. The framers also interface with the appropriate data sources and processors, such as audio coders/decoders, under microprocessor control as known in the art, to allow the transmission and reception/processing of digital data through the busses 18, as depicted in FIG. 4 and as will be discussed infra. As each communications unit has two framers, designated as end 1 and end 2, communications is enabled in a point-to-point manner in each of two directions (e.g. "front" and "back"), between a framer and with the corresponding framer of the communications unit to which it is connected.

Under E1/T1 protocols, a framer may operate either in a master, slave or free-run mode. A framer operating in the master mode must be provided with clock and timing inputs from another source, which is used to synchronize its output data. A framer operating in a slave mode recovers clock and timing information from the encoded data it receives from another framer over a transmission line. A slave framer can pass such information to another local framer to which it is coupled. Configuring the coupled framer to operate as a master fulfills the masters need for such information. A framer operating in a free-run mode generates its own clock and timing information and, like a slave unit, can provide the information to another framer. In this case, however, the framer utilizes an internal local oscillator for the creation of the information. Because the clock and timing signals throughout a communications system must be consistent there can be only one source (i.e., free run framer) of such signals for the system.

Figure 3:
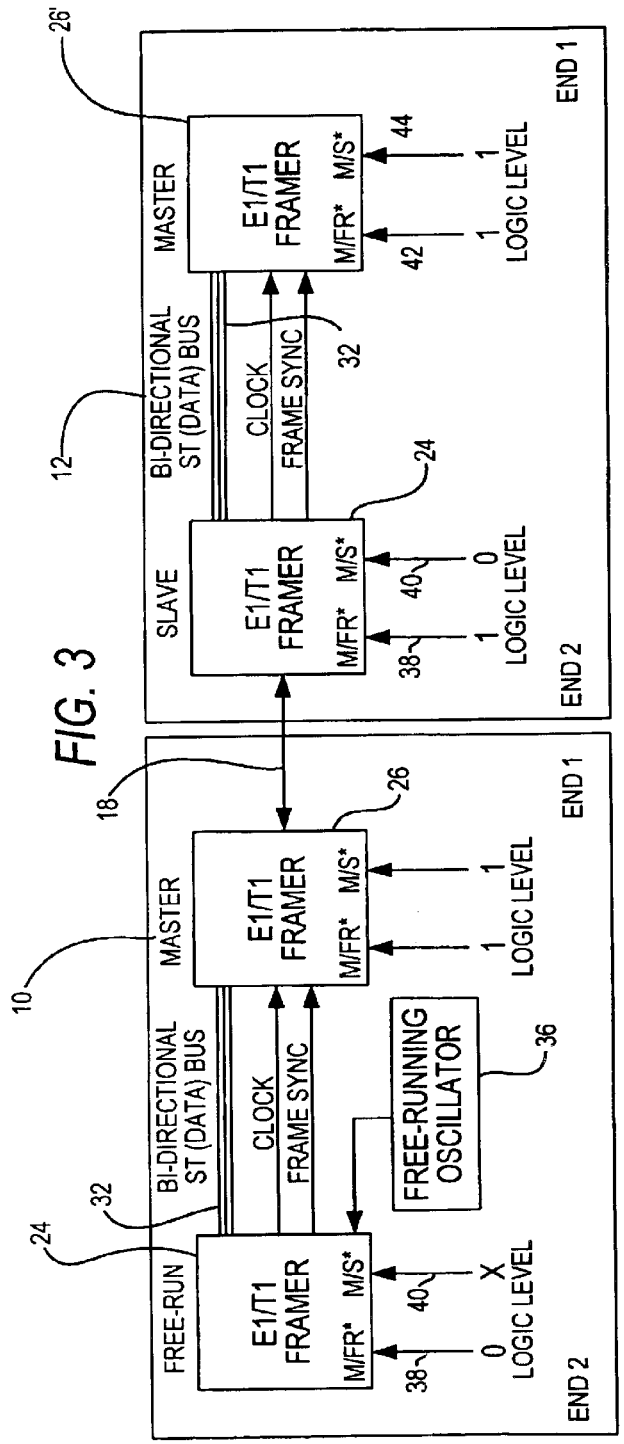
FIG. 3 is a block diagram of the two left-most pair of communications units of FIG. 2, further illustrating how the communications units are dynamically configured in accordance with the invention.

In consideration of the forgoing, the present invention provides for the designation of the two end or terminal units of the communications system (10 or 16 in FIG. 2) to include a free-run framer for the entire communications system. In communications unit 10 the free run unit would be framer 24; in communications unit 16 the free run unit would be framer 26". Because only one free run framer can be enabled for a communications system, the present invention further provides for the automated assignment of free run status, and the continued monitoring of the communications system to reassign such status as required. In FIG. 3 communications unit 12 is shown as including framer 24', associated with the unit's "end 2," serving as a slave, receiving timing and clock data over the send/receive bus 18 from master framer 26 in communications unit 10 and providing it over communications unit 12's internal bi-directional data bus 32 to framer 26' for "end 1," framer 26' serving as a master for a following communications unit (14 in FIG. 2). The communications unit 12 is then fully synchronized to the data which it receives and sends over the bus channel 18.

In FIG. 3 communications unit 10 is also depicted with its "end 2" framer 24 running in a free-run mode, utilizing oscillator 36 for generation of the timing and clock signals. Second framer 26 for "end 1" is configured as a master, and receives its clock and timing signals over the internal bus 32 from the framer 24, and subsequently passes such signals to slave framer 24' in the next communications unit 12.

As depicted in FIGS. 2 and 3, the present invention designates one framer of the two framers of an end or terminal communications unit to operate in the free-run mode to generate the timing and clock signals, and the other framer of the communications unit to operate as a master to pass the signals to the communications unit to which the terminal or end unit is coupled. The communications unit to which the terminal unit is coupled in turn must have a framer running in a slave mode connected to the end or terminal unit to recover the data and clock signals from the data transmitted to it from the end unit. The framer at the opposite end of the connected communications unit must again be a master to allow it to pass the timing and clock data which it receives from its paired slave unit to the next communications unit and specifically the slave framer therein. Such a structure is repeated and extends the length of the system.

Conventional E1/T1 systems do not afford self-configuration; when used in a point-to-point communications system a framer must be individually configured by a technician. The present invention allows a continuous system of communications nodes to be established, and provides for self configuration of all the framers therein, recognizing the end or terminal communications units and the individual framers therein, assigning free run status to one of the available framers of the terminal units, and configuring the remaining communications units and framers as required.

With reference again to FIG. 3, it can be seen that the status of each framer of each communications unit is controlled by a pair of inputs, 38, 40 for the first framer, and 42, 44 for the second framer. The two inputs for each framer are designated "master/not free run" and "master/not slave,"

respectively. FIG. 3A is a chart depicting the possible combinations for the two inputs and the resulting configuration for the framer. As shown, a logic "0" at a first input (38 or 42) configures the framer in free run, irrespective of the value of the second input (40 or 44) for the framer. With a logical "1" input at the first input, the framer is configured either as a master or a slave, dependent on the value of the second input 40/44; if the second input is "0", the framer is a slave; if it is a "1" the framer is a master. In conventional E1/T1 communications systems these values are determined in accordance with initial system requirements and are hard-wired or jumpered. The present invention generates the control signal pairs for each of the communications units in the system in a continuing, dynamic manner to immediately and continuously configure the communications units and their framers for proper operation as communications units are added and removed to the communications system formed by the individual communications units.

Figure 5:
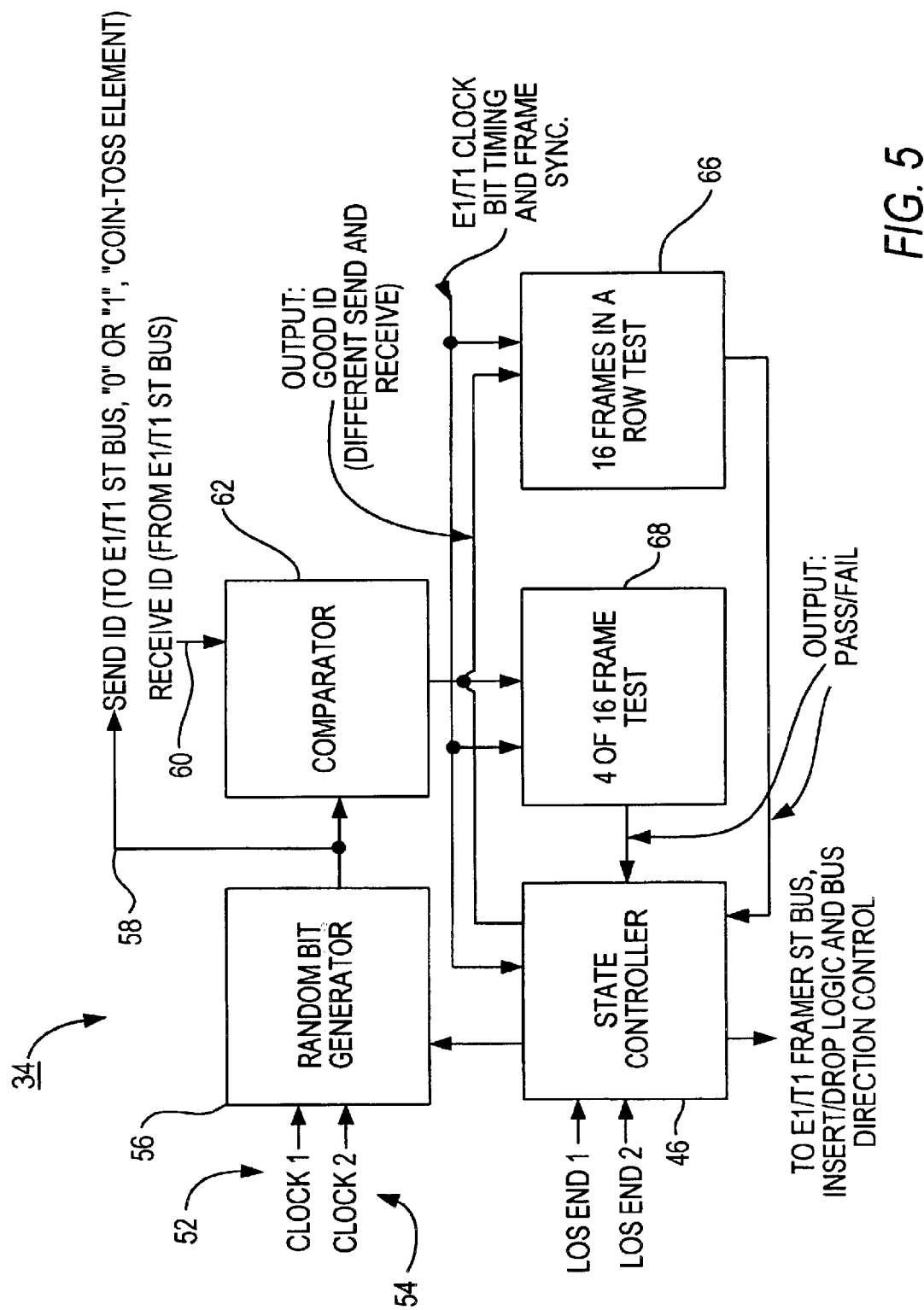
FIG. 5 is a block diagram depicting the adaptive mode logic control circuit of the invention which generates the configuration signals.
Figure 7:
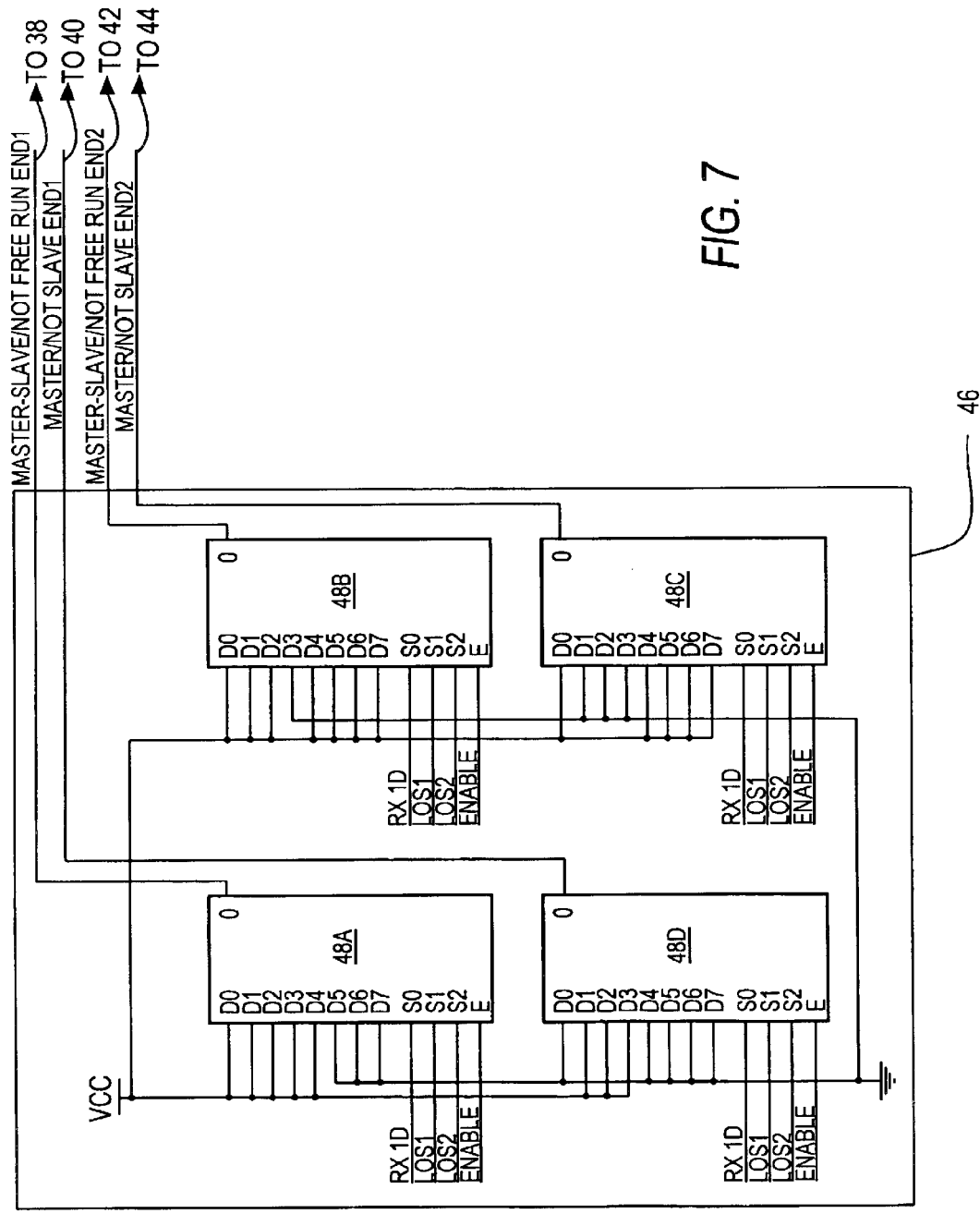
FIG. 7 is a schematic diagram of a logic processor for a state controller circuit portion of the adaptive mode circuit of FIG. 5.

The inputs 38–44 for the two framers of each communications unit are generated by the unit's AMC as depicted in FIG. 5, and more particularly the state controller portion 46 thereof depicted in FIG. 7. Each communications unit is provided with an AMC, which both generates certain data for transmission out by the framers of the communications unit and processes both similar data received by the communications unit's framers from the communications units to which it is coupled as well as data generated by the communications unit itself.

With reference to FIGS. 7 and 7A, the state controller 46 portions of the AMC comprises four demultiplexers 48A–D, each of which receives three bits of data and utilizes them to generate the four control bit logic signals to be inputted to the two framers of its communications unit. The three data bits are led into inputs S0, S1 and S2 of each of the demultiplexers, forming a 3 bit long binary input word referencing one of addresses 0 through 7 (000 through 111) of each of the demultiplexers, as presented in FIG. 7A. Each demultiplexer outputs either a high (Vcc) or low (ground) through its respective output O for each address as set by the data bits or inputs 50–52 in accordance with the programmed level (high or low) of the associated address D0 through D7.

With respect to demultiplexer 48A, for example, addresses D0 through D4 are at Vcc, while addresses D5 through D7 are at ground. Thus, when the inputs S0–S2 for demultiplexer 48A form the binary input word 101 (or 5), the value of D5 (ground or 0) is outputted at O. The four output lines of the four demultiplexers provide the needed framer state control inputs 38–44 as seen in FIG. 3. FIG. 7A depicts the state of the two framers (end 1, end 2) corresponding to each address inputted to the demultiplexers. Framer states for addresses 6 and 7 are not listed; they correspond to an irrelevant state in a connected communications system.

The inputs for S0, S1 and S2 of each of the demultiplexers are a received identifier bit (S0), plus two bits, (S1 and S2), which are indicative of the position of the communication unit in the communication system chain. In a preferred embodiment, the position values S1, S2 are derived from internal signals generated by the framers of the communications unit. In particular, each framer in an E1/T1 communications unit outputs a signal which is known as LOS (loss of synchronization) and which provides information reflecting whether the framer is connected to another framer through its main communications bus. This signal is a high/low value, it being high to indicate sync loss and lack of connection. The absence of LOS signals (i.e. the presence of connections) from both framers of a given communications unit is recognized by the AMC of the unit as indicating that the unit is an intermediate unit in the communications system, coupled to other communications units at both ends 1 and 2. The presence of a singe LOS signal, on the other hand, indicates that the communications unit is a terminal or end unit, the particular framer generating the LOS signal indicating the particular uncoupled end of the unit. Thus the AMC, by considering the LOS values, can recognize whether the communications unit in which it is employed is a terminal unit, capable of being configured with a free-run framer.

Once the determination is made whether a communications unit is an intermediate unit or an end or terminal unit, one of the two end units must be configured to include a free run framer for the communications system, and the other end unit configured without a free run framer. The present invention allows the two terminal units to "compete" with each other for free-run framer assignment. This competition is also conducted and resolved by the AMCs through a random "coin-toss" procedure, utilizing the consideration of identifier bits generated by each of the end or terminal communications units and transmitted to the other.

Figure 6:
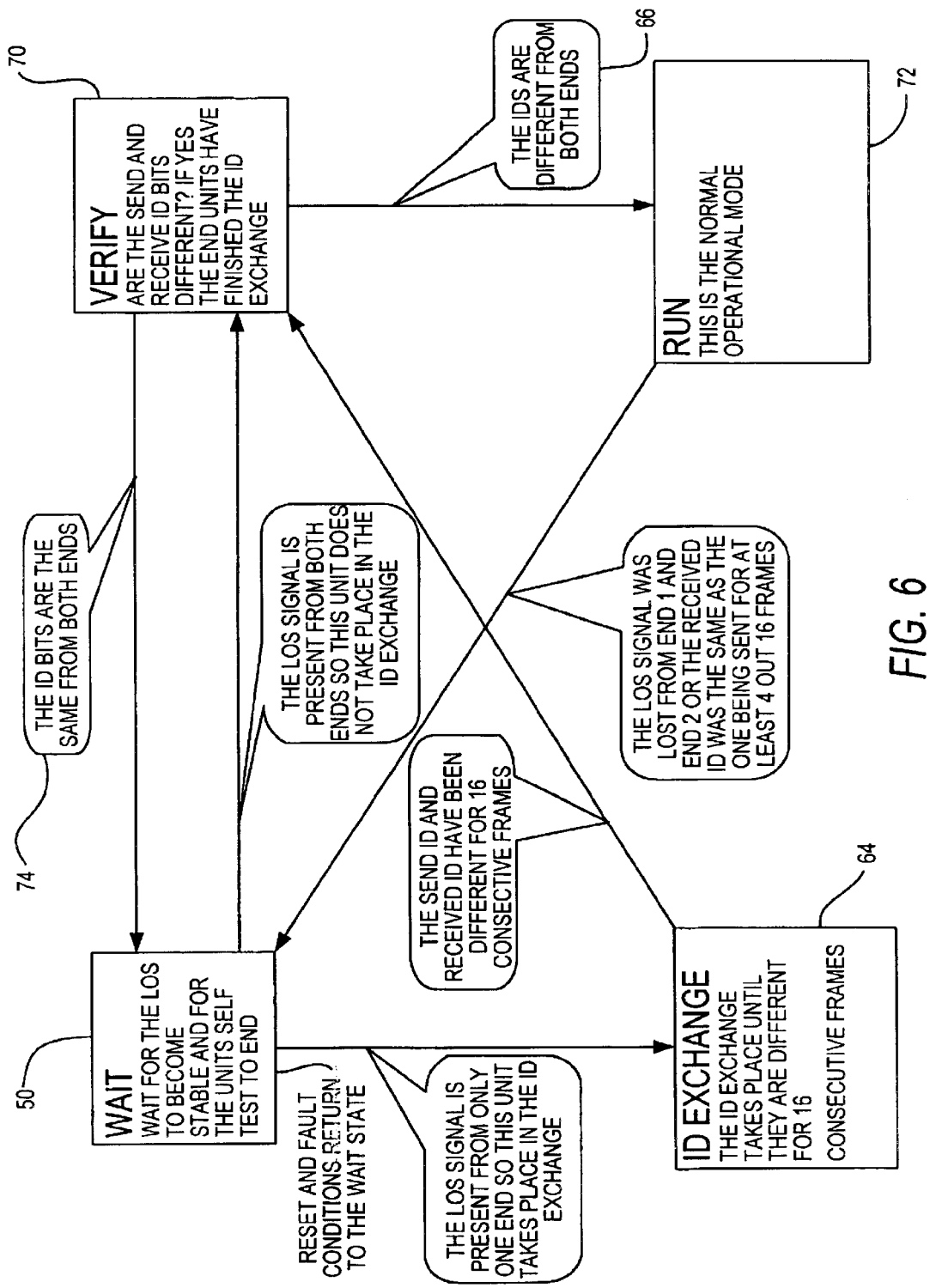
FIG. 6 is a state control diagram for a communications unit operating in accordance with the invention.

With reference to FIG. 6, upon system startup each AMC enters a wait state 50, during which the communications unit and its framers are allowed to pass through initial self test procedures, become stable, and generate LOS signals. Towards this end the invention takes advantage of a further characteristic of E1/T1 framers which allows the passage of data between framers, although imperfectly, without the framers being properly configured, and thus also allows the generation of LOS signals. The presence or lack of presence of the LOS signals is then monitored. Several frames of data containing LOS information may be analyzed to avoid a premature state determination. If the AMC detects the presence of two LOS signals, the AMC recognizes that the communications unit is an intermediate unit, not capable of participating in the coin toss procedure. If only a single LOS signal is present, indicating that the communications unit is an end or terminal unit, an id exchange state 64 is entered by the AMC. (The presence of two LOS signals, represented by addresses 6 and 7 in FIG. 7A, corresponds to a unconnected unit and thus an invalid configuration for a coupled communications unit.)

When the id exchange state is entered, the AMC of the communications unit first generates an identifier. The identifier is preferably a single bit "1" or "0," generated in a random fashion. As seen in FIG. 5, a free-running oscillator as known in the art (not shown) may be utilized to provide a first clock signal 52, whose output is latched to that of a second free-running oscillator (also not shown) operating at a different frequency and providing second clock signal 54. The frequencies are arbitrary, but are preferably chosen to be higher than the E1/T1 frame rate, such that the resulting beat is asynchronous with the frame rate. Random bit generator 56 uses the two clock signals to generate a one bit "0" or "1" identifier, which is latched into a register within the random bit generator. The lack of synchronization between the clock units, coupled with chance, insures that the identifier latched in the register will be essentially random, and that the identifier generated by the other AMC of the other terminal or end communication unit, similarly generated, will be different on average 50 percent of the time. The identifier bit is placed on line 58 for transmission out of the connected framer of the communication unit, as well as being passed to comparator 62. Because data transfer is enabled upon startup, the identifier bit is passed along the entire string of coupled communication units until it is received as an "Rx id" bit (see FIG. 46) by the other terminal or end unit. Simultaneously, the other terminal or end unit is developing its own identifier and is transmitting it out through its coupled framer to be received by the first end unit as its Rx id.

As the identifier is transmitted, the AMC receives the identifier broadcast by the other terminal or end communications unit on line 60 and enters the verify state 70 in FIG. 6. If the communications unit is an intermediate unit (determined by consideration of its LOS signals) the verify state is immediately entered without generation of an identifier. The intermediate unit merely passes the identifiers it receives from the units to which it is coupled from the receiving end and framer to the other.

In the verify state 70 the AMC of a terminal unit compares the received identifier in comparator 62 to the value of its own (transmitted) identifier. For initial configuration purposes, the output of the comparator, indicating whether the two identifiers are the same or different, is monitored for 16 data frames at 66, the output of the test being passed to state controller 46 as an enable signal. If the two identifiers are different for 16 consecutive frames the state controller is so advised and enabled, allowing the state controller to configure the framers, and the run state 72 (FIG. 6) is entered; the communications units being configured for operation.

If the two identifiers are the same, the AMC in each of the terminal units returns to the wait state at 74 and causes the assignment of a new identifier for its unit by the random bit generator 56. The newly generated identifier bit is again passed to the other terminal unit, and the comparison is again made. New pairs of identifier bits are continued to be generated by the terminal communications units and compared by both units until the 16 frame difference test is met. Each terminal unit then has a unique identifier assigned.

Once the difference test is passed and the run state 72 entered, the state controller processor of FIG. 7 in each communications unit processes the LOS and identifier data (if needed) to configure the framers of the unit for proper operation. With reference to FIGS. 3A and 7A, an Rx id value of 1 configures the respective communications unit with a free-run framer coupled to a master. The particular framer in the communications unit which is configured for free-run is determined by which LOS signal is present. As each of the intermediate communications units has no LOS signals, the programmed logic allows Rx id values to be ignored.

With the communications system in the run state 72, The AMC of each communications unit continues to monitor the identifiers latched and passing along the system. When an AMC of a terminal unit encounters the same received identifier as its own for a minimum of four frames in a series of 16 (block 68 in FIG. 5) the state controller 46 places the communications unit back into the wait state 50, causing new identifier bits to be generated and a new assignment of framer configurations to be generated. While a four frame change can be the result of transient interruptions in data flow, it also results when a lack of communication along the connected units occurs, such as when a rail car is uncoupled from the train, or a new communications unit (rail car) is added to an existing communications system. In either case, the AMCs sense the change and cause an immediate reconfiguration to occur, re-identifying each communications unit in the system as an intermediate or terminal unit, and generating identifiers as appropriate to assign a framer free run status and reconfigure the entire communications system as needed. The entire reconfiguration typically requires between 20 to 200 frames of data. With typical E1/T1 clock speeds, configuration will take from a few milliseconds to a few tenths of a second. The specific choice of four frames is arbitrary. The number of frames required, however, should be chosen with consideration of the size of the system and the likely error rate.

With proper framer configuration enabled, data is transferred from communications unit to communications unit in the system through a series of point-to-point links established between the coupled framers of adjacent communications units. As E1/T1 framers have a plurality of digital data communications channel busses, a plurality of individual channels can be utilized for a plurality of different types of data. In a rail car train, for example, intercom and public address signals can be placed on different channels, in which the audio information is converted to and transmitted in a digitized form as known in the art, while the transmission of identifier bits is made over another channel. Each communications unit may also include the necessary circuitry, as known in the art, to digitize generated audio signals and convert received digital data to an analog signal as required. The present invention utilizes a first set of channels to control the passage of the communications data by the use of preamble bits in association with an individual communication unit's identification data. The preamble data, which may be placed for example on channels 0–3, directs and controls the corresponding channels of communications data, for example channels 4–7

FIG. 4 is a block diagram of the interconnection between the framer 24' and a framer 26' in a given communications unit, such as unit 12 or 14 in FIG. 2. The local communications serial bus 32 between the framer units is shown as a pair of interconnections, one of which transmits information from framer 24' to framer 26', the other transmitting data from framer 26' to framer 24'. In practice, however, each of the lines comprise a plurality of lines or channels, for both preamble data and different communications data. Each of the channels (both transmit and receive for each of the framers) is provided with an insertion multiplexer 76 which allows locally generated data to be placed on an appropriate channel line and passed to each of the framers for transmission to the coupled communication units in the system. Each of the insertion multiplexers 76 are coupled to insert control 78 which both directs the delivered data to the proper channel and controls the insertion timing thereof. Insert control 78 in turn is fed by a series of data conversion/processing units, such as codecs 80, each of which encodes or processes data, such as analog audio data, received from an appropriate input device, such as a public address microphone system, intercom, or the like, and converts it into an appropriate format, such as a digital format, for ultimate transmission by the framers 24', 26'. The actual number of codecs or other conversion/processing units will be determined by both the number of audio channels required for communication purposes and the ultimate capabilities of the framers. In addition to receiving the encoded audio data, insert control 78 receives preamble data on control channels 0–3. The preamble data configures each of the communications units of the system in a dynamic manner for transmission and receipt of the audio data on channels 4–7.

Bus interface 82, which is coupled to a CPU for the communications unit, provides the preamble signals for insert controller 78 and generates such information to identify the inserted data such that it can be passed to selective communication units, as and if required. By placing the preamble information on separate channels from the data which it controls, processing of the preamble information can be performed without risk of corrupting or dropping portions of the controlled data.

In addition to the serial bus 32 being provided with insertion multiplexers 76, it is also provided with a pair of demultiplexers 84 which allow the extraction of data received by the framers. The demultiplexers extract the received digital data on each of the channels and, through control switches 86, pass the data for appropriate processing, including decoding into analog signals as appropriate. Among the output of the demultiplexers 84 is received preamble identification data of the type added by insert control 78. The received preamble information is detected by preamble detector 88 which in turn is coupled to the switches 86, controlling the switches to allow the received communications data to be decoded if received preamble information indicates that it is destined for the particular communications unit. The output of the preamble detectors is also led to timing controller 90, which provides the selective timing for the insertion of data to insure that generated data for transmission out does not conflict or collide with data generated by other communications units passing along the system.

As shown in the figure, both sets of transmit/receive channels of serial bus 32 are provided with both insert and multiplexers 76 and demultiplexers 84. In operation, however, communications across the serial bus are enabled only in one direction. That is, only one multiplexer and demultiplexer of a communications unit is active, each active device being associated with a different group of channels. One of the end or terminal communications units is configured in a loop-back mode, such that the received data is re-transmitted back to the communications unit to which the terminal unit is connected. This ensures that, even though transmissions between communications units flow in only direction, all transmissions travel throughout the system. The direction in which the data passes is not critical. Indeed, the choice of direction may be made in a random manner. Because the coin-toss procedure discussed above provides for dynamic reallocation of free-run status to a terminal unit, it may be efficient to use the same indicator bit to control data flow direction. Use of such a bit also allows for dynamic reconfiguration of the communications units at the communications level as units are added or dropped to the system.

Each communication units CPU is aware of the nature of the communications unit as either a terminal/end unit or an intermediate unit, and also whether, if a terminal unit, the unit is set for free run. In a preferred embodiment of the invention, the communications unit set for free run is also designated the parent unit for communications purposes. Accordingly, that unit controls the communication traffic on the system. This is done by requiring a communications unit to seek control of a communications channel before data is placed thereon. By having one communications unit, and particularly the designated parent unit supervise all communications, conflicting and colliding data to one or more child units on channels are prevented.

When a child unit requires access to a bus for transmission purposes, it must first obtain "permission" from the parent unit. Preamble data on control channel is utilized for such purposes. All children monitor the control channels on one end and retransmit the received preamble data out the opposite end from which it is received.

The parent unit polls each child unit individually on a periodic basis to determine if a child unit requires access to a bus for a transmission. Again, the polling may be performed by the transmission of appropriate preamble data. The poll request is passed down the line from communications unit to communications unit, allowing it to reach the unit to which it is directed. As each communications unit has an individual identification, a poll request can be designated for a particular unit and can be recognized as such by each unit in the system as it is passed therealong. When the poll request reaches the polled child, the child unit transmits a poll response within a specified poll response period, which is again passed by one of its framers out the appropriate end of the unit and passed from unit to unit until it reaches the parent unit. After each child has been polled and given a poll response opportunity, the parent issues a "poll response from parent" preamble message, typically granting authority to transmit on a particular channel. The poll response from parent message is similarly passed along the line from communications unit to communications unit and is acted upon as required by each child unit. An "event" can be attached to either a poll request or poll response from parent transmission. This can be for example, an instruction to each child in a rail car system unit to update a sign message board in the car associated with the child unit. The event is received and re-transmitted by each child along the communications system, insuring that all units receive the event information and act on it accordingly in accordance with the preamble information associated with the transmission. Again, as each communication unit has a specific identifier associated with it, events can be directed to specific units as required. All of the foregoing is preferably implemented and controlled as known in the art by the communications units' cpus.

I claim:

1. A multi-point communications system, comprising a plurality of communication units coupled together in a series point-to-point configuration, each of said communications units comprising:

a first framer operating under an E1/T1 protocol having a communications port for bi-directional point-to-point communication with a first remote communications unit and a local communications port;

a second framer operating under an E1/T1 protocol having a communications port for bi-directional point-to-point data communications with a second remote communications unit and a local communications port; and control means coupled to the first and second framers for controlling the passage of communications data generated by the communications unit to said first and second framers for transmission to the coupled remote communications units and for controlling the passage of communications data received by one of said first and second framers from a remote communication unit to the other of said first and second framers for further transmission to another remote communications unit.

2. The communications system of claim 1 wherein said control means is coupled to the local communications ports of the first and second framers.

3. The communications system of claim 2 wherein said control means comprise means for placing preamble data on a first group of channels and communications data controlled by said preamble data on a second group of channels.

4. The communications system of claim 3 further comprising means in each of the communications units for dynamically assigning one of the framers of one of the communications units of the communications system free run status to provide timing signals for the communications system.

5. The communications system of claim 4 wherein said dynamic assignment means includes means for identifying terminal communications of the communications system and assigning free run status to one of the framers of one of the terminal communications units.

6. The communications system of claim 5 wherein said dynamic assignment means further includes means for assigning parent status to the communications unit having the free run status framer.

7. The communications system of claim 6 wherein said communications unit having parent status controls the sequence and timing of data communications along the communications system.

8. The communications system of claim 4 wherein said control means further comprise a pair of multiplexers each coupled to the local communications ports of the first and second framers and means for selectively enabling one of said multiplexers to direct the direction of communications between communications units.

9. The communications system of claim 8 wherein said control means further comprises a pair or demultiplexers each coupled to the local communications ports of the first and second framers.

* * * * *